United States Patent [19]

Prinsze

[11] 4,350,946
[45] Sep. 21, 1982

[54] MULTIPLE CONSTANT CURRENT BATTERY CHARGING APPARATUS

[76] Inventor: Onno M. Prinsze, 4528 N. Pima Rd., Scottsdale, Ariz. 85261

[21] Appl. No.: 104,311

[22] Filed: Dec. 17, 1979

[51] Int. Cl.³ .............................................. H02J 7/04
[52] U.S. Cl. ....................................... 320/22; 320/48; 320/56; 323/272
[58] Field of Search ...................... 320/2, 3, 4, 20, 21, 320/22, 27, 28, 29, 48, 56, DIG. 1; 323/269, 272, 350

[56] References Cited

U.S. PATENT DOCUMENTS 2,368,264 1/1945 Scott et al. ............................ 320/21
4,006,396 2/1977 Bogut ..................................... 320/2

Primary Examiner—Robert J. Hickey
Attorney, Agent, or Firm—H. Gordon Shields

[57] ABSTRACT

An array of low wattage low voltage current regulators is used to provide a multiple of regulated constant currents for charging a variable number of rechargeable batteries from a given power source voltage at any of a plurality of settings by changing the current capacity. Visual indications of the current settings are also provided.

6 Claims, 2 Drawing Figures

MULTIPLE CONSTANT CURRENT BATTERY CHARGING APPARATUS

BACKGROUND OF THE INVENTION

1. Field of the Invention

This invention relates to apparatus for charging rechargeable batteries, and more particularly, to apparatus for recharging rechargeable batteries which provides multiple regulated constant charging currents and accordingly variable charging power by using different charging current settings.

2. Description of the Prior Art

U.S. Pat. No. 3,829,676 describes a rechargeable flashlight apparatus for use in a vehicle. The apparatus uses constant voltage rather than constant current. There is no provision for providing a fixed or predetermined constant charging current for the apparatus. The charging current varies as a consequence of variations of power source voltage and the number of cells being charged, and no visual indications of the charging status of the apparatus is provided.

U.S. Pat. No. 3,890,555 describes another battery charging system using constant voltage. The apparatus will allow for the charging of only a fixed number of cells. Switching transistors, in combination with a diode, are required for visual indication of the system status.

U.S. Pat. No. 4,092,580 discloses a rechargeable battery apparatus for a flashlight. The apparatus may be incorporated into an automotive electrical system. A pair of lamps are used to indicate whether the charging circuitry is in a high or in a low mode or status. The high or the low mode is selectively engaged by the user. The lamps also act as current limiters for charging purposes and as fuses for the protection of the circuitry.

Copending application Ser. No. 964,944, by the same inventor as the present application, describes battery charging apparatus for charging rechargeable batteries using regulated constant current. Visual indications by light emitting diodes (LEDs) are also provided. The apparatus is satisfactory for many recharging purposes, but the apparatus has an inherent limitation as to the amount of charging current available for charging, due to current capacity of the integrated circuit regulator.

The apparatus of the present invention utilizes regulated constant current sources and multiple current settings to provide for the simultaneous charging of a number of rechargeable batteries or cells at various charging currents and at current values exceeding the maximum current capacity of a single integrated circuit regulator.

SUMMARY OF THE INVENTION

The apparatus described and claimed herein comprises apparatus for charging rechargeable batteries, such as rechargeable flashlight batteries, utilizing a plurality of low wattage constant current elements in parallel to provide a cumulative constant charging current selectively applied to the cells being charged, and a visual indication of the charging current mode is also provided.

Low wattage, low voltage current regulating elements are being utilized in order to avoid the need of heatsinks and in order to consume the lowest possible voltage value for current regulation, which leaves the highest possible voltage value available to charge the maximum number of battery cells from a given power source voltage. At the same time, however, the voltage level is sufficient to forward bias the light emitting status indicator diodes. Higher wattage regulators operating with higher voltages would permit a lesser number of cells to be charged at constant current from the same given voltage source.

Among the objects of the present invention are the following:

To provide new and useful apparatus for charging rechargeable batteries;

To provide new and useful circuitry apparatus for charging rechargeable flashlight batteries;

To provide new and useful apparatus for charging rechargeable cells utilizing a plurality of low wattage current regulators;

To provide a new and useful battery charging apparatus permitting charging of a maximum number of battery cells from a given power source voltage and providing visual indication of charging operation;

To provide new and useful recharging circuitry apparatus utilizing a plurality of constant current elements;

To provide new and useful battery charging apparatus having a plurality of charging current value modes;

To provide new and useful battery charging apparatus having visual indications of the charging current value being used;

To provide new and useful battery charging apparatus having a visual indication of power source failure;

To provide new and useful battery charging apparatus having selectable charging currents and visual indications of the charging current selected; and To provide new and useful apparatus for charging rechargeable batteries having a selectable charging current.

DESCRIPTION OF THE PREFERRED EMBODIMENT

Figure 1:
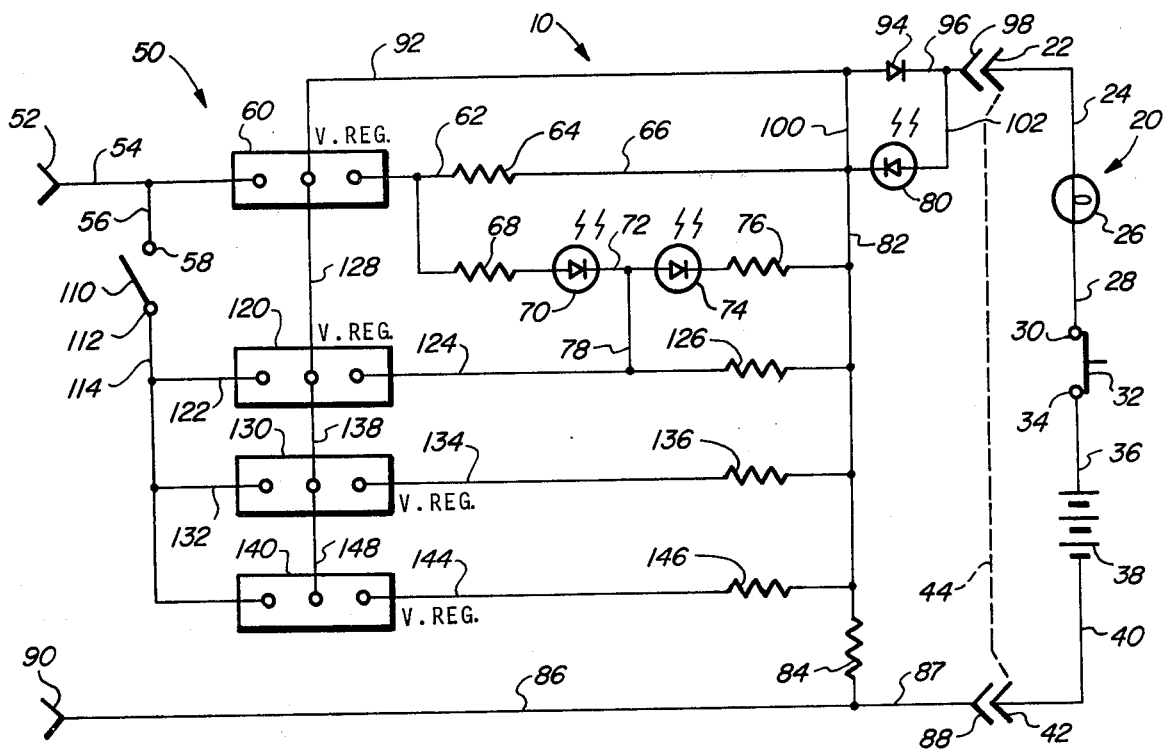
FIG. 1 comprises a schematic drawing of the apparatus of the present invention.

FIG. 1 comprises a schematic diagram of battery charging apparatus 10 of the present invention. The battery charging apparatus 10 includes a flashlight 20 and charging circuitry apparatus 50. The flashlight 20 includes a terminal 22 and a terminal 42, which terminals mate with a pair of terminals 98 and 88, respectively, of the charging circuitry apparatus 50. The four terminals 22, 98 and 42, 88 connect together the flashlight 20 and the charging circuitry 50 for recharging rechargeable batteries in the flashlight 20.

The flashlight 20 includes a conductor 24 which extends from the terminal 22 to a lamp 26. A conductor 28 extends from the lamp 26 to a terminal 30 of a switch 32. The switch 32 is an on/off switch which makes or breaks the connection between the terminal 30 to a terminal 34 to turn the flashlight 20 on or off. From the terminal 34, a conductor 36 extends to a rechargeable battery 38. The battery 38 may include as many cells as desired.

A conductor 40 extends from the battery 38 to the terminal 42. The placement of the three element lamp switch and battery may vary, depending on mechanical construction of the flashlight, but the placement will not influence the operation of the invention.

In typical usage, flashlights usually include two, three, four, or more cells. With respect to the state of the art, a single or multiple of high wattage current regulating elements may place a limitation on the number of cells of a flashlight battery which may be recharged at constant current. This is due to the consumption of voltage in the charging current regulator of the battery charging circuitry. As a rule, high current, high wattage voltage or current regulators operate at a higher constant voltage level than the lower wattage devices. The apparatus 10 of the present invention utilizes a multiple array of low wattage, lower voltage current regulating elements 60 leaving a greater voltage to enable a larger number of cells of the rechargeable battery 38 to be recharged.

When the flashlight 20 is not connected to the charging circuitry 50, the conductors 24 and 40, and their respective terminals 22 and 42, are automatically connected together. The connection is schematically represented by a conductor 44 shown in phantom in FIG. 1. The switch 32 controls the lamp 26 by opening and closing the circuit between the lamp and the battery 38 when the flashlight is in such use. However, when the flashlight 20 is connected to the charging circuitry 50, the terminals 22 and 42 are disconnected from conductor 44 and are connected to their mating terminals 98 and 88 of the charging circuitry 50. The switch 32 must be in the "on" position, bridging or connecting the terminals 30 and 34, to complete the electrical circuit through the rechargeable battery 38. If the switch 32 is not in an "on" or closed position, as shown in FIG. 1, the charging circuitry 50 is disconnected from the cells comprising the rechargeable battery 38, and no recharging of the battery 38 will occur.

The charging circuitry 50 includes a pair of terminals 52 and 90 which are connected to an appropriate direct current voltage source, such as a battery of an automobile, or, through an appropriate transformer and rectifier, to a household appliance circuit. If the flashlight and the charging circuitry 50 are disposed in an automotive vehicle, it is optional whether the charging circuitry 50 be controlled through the ignition switch, or whether the charging circuitry be "hot wired" so as to provide charging current for the battery 38 at all times. "Hot wiring" allows the charging circuitry 50 to maintain the battery 38 charged at all times, and not just when the ignition switch of an automotive vehicle completes the electrical connection to the automotive battery.

From the terminal 52, a conductor 54 extends to the input terminal of a constant voltage integrated circuit (IC) 60. In the battery charging circuit 50, the constant voltage IC 60 acts as a constant current element to provide a constant charging current due to the presence of a resistor 64, which comprises a fixed resistance, in the circuit.

From the conductor 54, a conductor 56 extends to a terminal 58. The terminal 58 is part of a switch 110 which connects one or more additional constant voltage ICs. FIG. 1 shows ICs 120, 130, and 140 in parallel with the IC 60 to provide additional charging current for the battery 38.

A conductor 62 extends from the output terminal of the IC 60 to one side of the resistor 64. The other side of the resistor 64 is connected to a conductor 66. The conductor 66 extends from the resistor 64 to the cathode of a light emitting diode 80. The light emitting diode (LED) 80 emits yellow light when an electric current is passed through it. The anode of LED 80 is connected through conductors 102 and 96 to the positive output terminal of the charging circuitry 50.

A resistor 68 extends from the conductor 62 to the anode of another light emitting diode 70. The light emitting diode (LED) 70 glows with a green color when a current passes through it.

The cathode of the LED 70 is connected to the anode of another light emitting diode 74 by a conductor 72. The LED 74 glows with a red color when a current passes through it. The cathode of the LED 74 is connected to one side of a resistor 76.

The other side of the resistor 76, remote from the LED 74, is connected to a conductor 82. The conductor 82 extends from the conductor 66, between the resistor 64 and the cathode of the LED 80, to one side of a resistor 84. The other side of the resistor 84 is connected to the tie point of a conductor 86 and a conductor 87, which extends to the voltage source terminal 90 and to the terminal 88, respectively.

The voltage regulators 60, 120, 130, and 140, in addition to each having an input and an output terminal, also have a third terminal which comprises a feedback or control terminal. The feedback terminal for the current regulator 60 is connected by a conductor 92 to the anode of a diode 94. The cathode of the diode 94 is connected to the terminal 98 by a conductor 96. A conductor 100 extends from the conductor 66 to the conductor 92. The anode of the LED 80 is connected by a conductor 102 to the conductor 96.

If a malfunction in the charging circuitry 50 occurs, with the flashlight 20 connected to the charging circuitry and with the switch 32 in the closed or "on" position, the battery 38 of the flashlight 20 becomes the power source for a secondary circuit in the charging circuit 50. The secondary circuit includes the terminal 98, the conductor 96, the conductor 102, the LED 80, the conductor 82, the resistor 84, the conductor 87, and the terminal 88.

When such power failure occurs, the diode 94 prevents current from the flashlight 20 from flowing to the primary charging circuitry, and thus current flows through the LED 80, the conductor 82, and the resistor 84. The resistor 84 comprises the load resistor for the secondary circuit when the flashlight battery 38 is the primary power source due to failure of the charging circuitry 50 or to a failure of the input power source to the charging circuitry through the terminals 52 and 90.

When a power source is connected to the terminals 52 and 90, with the switch 32 closed, no current flows through the LED 80. The LED 80 accordingly glows yellow only when the charging circuitry is inoperative and the secondary circuit, which includes the diode 80 and the load resistor 84, is operative and is powered by the flashlight battery 38. LED 80 consequently serves as a "power failure" indicator.

The switch 110 is connected to a terminal 112, and the terminal 112 is in turn connected to a conductor 114. The conductor 114 extends from the terminal 112 to the input terminal of the current regulator IC 140. The input terminals of the current regulator ICs 120 and 130 are connected to the conductor 114 by conductors 122 and 132, respectively. The output conductor of the current regulator 120 is connected to a conductor 124, and the conductor 124 is connected to a conductor 78 and to a resistor 126. The resistor 126 is in turn connected to the conductor 82, while the conductor 78 is connected to the conductor 72, which extends between the cathode of the LED 70 and the anode of the LED 74.

The output terminal of the current regulator 130 is connected by a conductor 134 and a resistor 136 to the conductor 82. The output terminal of the current regulator 140 is connected to the conductor 82 by a conductor 144 and a resistor 146. The feedback or control terminals of the current regulators are connected together, with a conductor 128 extending between the current regulators 60 and 120, a conductor 138 extending between current regulators 120 and 130, and a conductor 148 extending between voltage regulators 130 and 140. The control terminals are accordingly serially connected together.

With the switch 110 in the open position as shown in FIG. 1, the ICs 120, 130, and 140 are inoperative. Accordingly, the IC 60 is providing a low constant current for the rechargeable battery 38, assuming that the switch 32 is closed. From the output terminal of the current regulator 60, a first current path through the conductor 62, resistor 64, and conductor 66 is provided in the charging circuitry. A second and parallel current path is provided through resistor 68 from the conductor 62, through LED 70, conductor 72, conductor 78, the conductor 124, and the resistor 126 to the conductor 82. The combined charging current then flows through conductor 100, diode 94, conductor 96, and the terminal 98 to the flashlight 20. The return path for the charging current is from the flashlight 20 through terminal 88 and the conductors 87 and 86 to the terminal 90. The value of the regulated constant charging current is controlled by the value of the resistor 68, the LED 70, and the value of the resistor 126. The value of the resistor 68 is chosen to properly energize the LED 70. The LED 70 glows green and accordingly provides a visual indication that the low charging circuitry is operating.

Since the LED 74, in series with resistor 76, is in parallel with resistor 126, no current will flow through it since the voltage present across resistor 126 is too low to forward bias the LED 74.

When the switch 110 is closed, making contact with the terminal 58, the current regulators 120, 130, and 140 are operative and are in parallel with the current regulator 60 to provide a constant current higher than the charging current that may be provided only from the current regulator IC 60. This is accomplished by means of the fixed resistors 126, 136, and 146, along with the LED 74 and the resistor 76. With the current regulator IC 120 functioning, the voltage across resistor 126 is sufficient to forward bias the LED 74 which accordingly glows red. The red glow indicates visually that the battery charger circuitry 50 is the high current charging mode.

The current regulator ICs 60, 120, 130, and 140 are preferably substantially identical and accordingly provide substantially the same voltage output. With the same voltage output, there is substantially no voltage difference between conductors 62 and 124, and accordingly no current flows through the resistor 68 and the LED 70.

The resistor 136 establishes the current output from the IC 130 to the conductor 82, and the resistor 146 determines the current output of the IC 140 to the conductor 82.

By Kirchhoff's Law, the charging current through the rechargeable battery 38 is the sum of the currents in the parallel circuits from the ICs 60, 120, 130, and 140. The additive charging currents from each of the ICs accordingly enables the battery 38 to be comprised of more cells than would be possible when using one single higher wattage, higher voltage, current regulator from a given power source, but particularly from the limited voltage of an automotive battery, with a nominal voltage of 14.5. In such a situation, the four voltage regulator ICs are acting as constant current sources for charging a maximum number of cells comprising the rechargeable battery 38 in the flashlight 20.

Selectively opening and closing the switch 110 allows the charging circuitry 50 to be used as a trickle charger to maintain the batteries 38 at their peak charge, or alternatively allows the ICs 120, 130, and 140 to provide maximum charging current for recharging the battery 38 after heavy use. The visual indications provided by the LEDs 70 and 74 allow a user to note the status of the charging current at a glance. Moreover, the use of the LED 80 provides a visual indication that the charging circuitry 50 is inoperative, usually as a consequence of a power source failure.

The secondary circuit operative during the power failure mode, using the flashlight battery energy to activate the mode indicator LED 80, features an extremely low current drain of approximately one milliampere. This permits the failure mode to be operative for extended periods of time, virtually not affecting the useful burn time of the flashlight when needed most, namely during a power failure. Systems which automatically turn the flashlight itself on during a power failure cause the flashlight batteries to be exhausted at the same rate as under normal use, thereby severely limiting useful operations when power failures go undetected for some time. The secondary circuit of the present invention overcomes such a problem.

Figure 2:
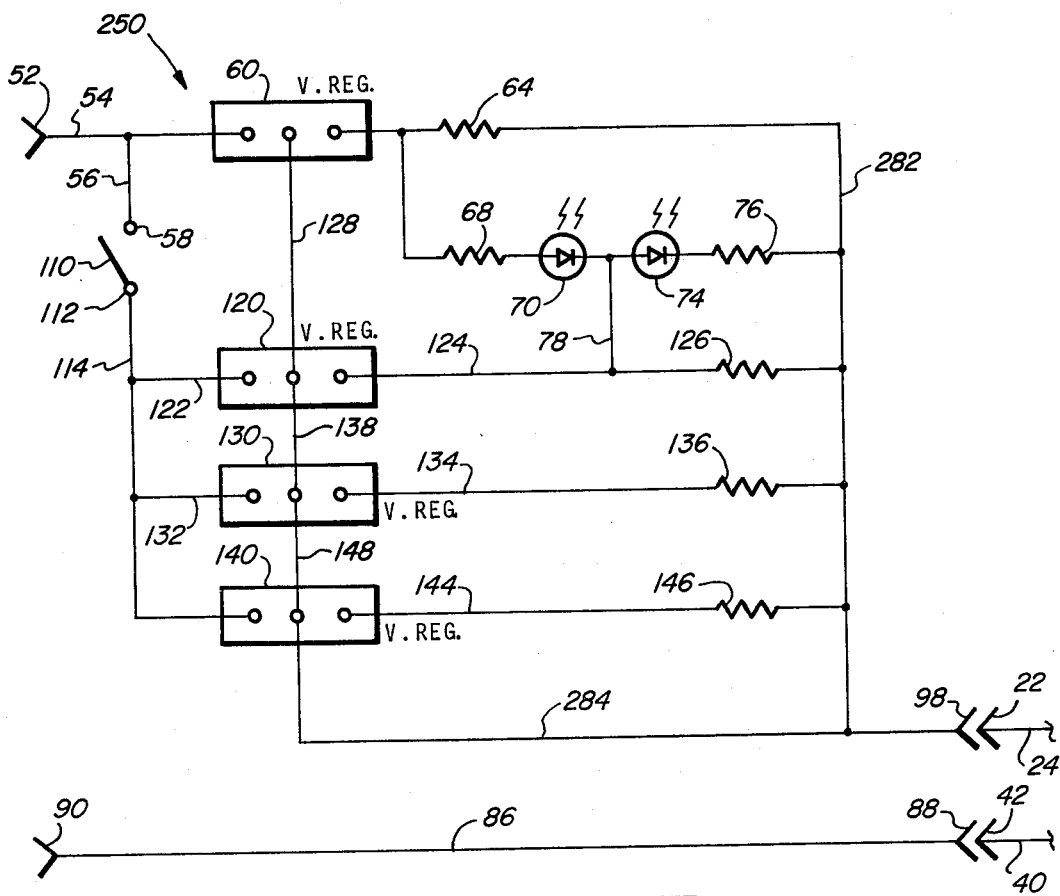
FIG. 2 is a schematic drawing of an alternate embodiment of the apparatus of the present invention.

If the failure mode or secondary circuitry of the embodiment of FIG. 1 is not desired, then multiple constant current charging apparatus such as shown in FIG. 2 may be used. FIG. 2 comprises a schematic diagram of an alternate embodiment of the apparatus of FIG. 1, eliminating the secondary circuit of FIG. 1, which includes the yellow LED 80 of FIG. 1, the resistor 84, and the diode 94. In other respects, the apparatus of FIG. 2, comprising a charging circuit 250, is substantially the same as disclosed in FIG. 1 and as discussed above.

The terminals 52 and 90 connect to an appropriate voltage source, such as a battery, for providing a current through the charging circuitry 250 to a flashlight, such as the flashlight 20 of FIG. 1. The conductors 24 and 40 of the flashlight 20 are connected to terminals 22 and 42, respectively, which in turn are connected to the terminals 98 and 88, respectively, of the charging circuitry 250. The terminals 88 and 90 are connected by a conductor 86. The terminal 98 is connected by a conductor 282 and a resistor 64 to the output terminal of the current regulator 60. The input terminal of the current regulator 60 is connected to the terminal 52 by a conductor 54. For increasing the charging current to the flashlight 20, the three current regulators 120, 130, and 140 are connected in parallel with the current regulator 60 to the switch 110. For indicating the low or trickle charging current of only the current regulator 60, the LED 70 is used. The higher charging current of the current regulators 120, 130, and 140 in parallel with the current from the current regulator 60 is indicated by the LED 74. The use of the LEDs 70 and 74 is discussed above in conjunction with FIG. 1.

The output terminal of the current regulator 60 is connected by a resistor 64 and a conductor 282 to the terminal 98. The terminal 98 in turn mates with the terminal 22 of the flashlight 20. The output terminals of the current regulators 120, 130, and 140 are connected through resistors and by their respective conductors to the conductor 282.

A conductor 284 extends from the conductor 282 adjacent the terminal 98 to the feedback or control terminal of the current regulator 140. The conductors 128, 138, and 148 in turn connect the control terminals of the four current regulators in series, as illustrated in both FIGS. 1 and 2, and as discussed above in conjunction with FIG. 1.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Multiple constant current charging apparatus for charging a rechargeable battery, comprising, in combination:
   voltage means for providing a direct current voltage source;
   first constant current means connected to the voltage means for providing a first substantially constant charging current, including a first voltage regulator for providing a substantially constant voltage from the voltage means and a first resistor in series with the first voltage regulator for providing the first substantially constant charging current;
   second constant current means for providing a second substantially constant charging current;
   conductor means for connecting the first constant current means and the second constant current means to a battery for charging; and
   switch means comprising a single switch for selectively connecting and disconnecting as desired the voltage means to the second constant current means for providing either the first substantially constant current for charging the battery or the first and second substantially constant currents for charging the battery.

2. The apparatus of claim 1 in which the first constant current means includes first visual means for visually indicating that the first substantially constant charging current is connected to the battery for charging the battery.

3. The apparatus of claim 2 in which the second constant current means includes second visual means for visually indicating that the first and second substantially constant charging currents are connected to the battery for charging the battery.

4. The apparatus of claim 3 in which the conductor means includes third visual means for visually indicating that charging current is not flowing to the battery to charge the battery.

5. The apparatus of claim 1 in which the second constant current means includes a second voltage regulator for providing a substantially constant voltage from the voltage means and a second resistor in series with the second voltage regulator for providing the second substantially constant charging current.

6. The apparatus of claim 1 in which the second constant current means includes a plurality of voltage regulators in parallel and a plurality of resistors, with a resistor in series with each voltage regulator to provide a plurality of substantially constant charging currents, the sum of which plurality of substantially constant charging currents comprises the second substantially constant charging current.

* * * * *